United States Patent [19]

Wilson

[11] Patent Number: 4,824,133
[45] Date of Patent: Apr. 25, 1989

[54] TRAILER CADDY

[76] Inventor: Gary W. Wilson, Rte 2, Box 517-AA, Zwolle, La. 71486

[21] Appl. No.: 196,069

[22] Filed: May 17, 1988

[51] Int. Cl.$^4$ .............................. B60P 3/10; B60S 9/14
[52] U.S. Cl. .................... 280/414.1; 254/418;
    280/475; 280/763.1; 280/767
[58] Field of Search ............... 280/414.1, 414.2, 414.5,
    280/476 R, 475, 405 R, , 400, 35, 656, 789,
    763.1, 764.1, 765.1, 766.1, 767, 47.13 B, 301;
    180/199; 414/462, 474, 476; 248/129, 439;
    254/418, 420; 114/344

[56] References Cited

U.S. PATENT DOCUMENTS

| 3,471,168 | 10/1969 | Steinberg | 280/767 |
| 4,070,041 | 1/1978 | Brammer | 280/763.1 |
| 4,605,086 | 8/1986 | Maron | 280/767 |
| 4,681,334 | 7/1987 | O'Brien | 280/414.1 |

FOREIGN PATENT DOCUMENTS

| 2843373 | 4/1980 | Fed. Rep. of Germany | 280/767 |
| 2846791 | 5/1980 | Fed. Rep. of Germany | 280/414.1 |

Primary Examiner—David M. Mitchell
Assistant Examiner—Everett G. Diederiks, Jr.
Attorney, Agent, or Firm—Richard C. Litman

[57] ABSTRACT

An auxiliary wheeled support for the rear of a trailer works in combination with the wheeled front trailer jack to increase the maneuverability of the trailer by raising the main trailer wheels off the ground. The invention disclosed swings to a storage position when not in use, and is adjustable to fit a range of trailer heights.

4 Claims, 4 Drawing Sheets

TRAILER CADDY

BACKGROUND OF THE INVENTION

1. Field of the Invention

The invention relates to an auxiliary roller wheel support device for trailers, such as boat trailers. More particularly, the invention is directed to an improved auxiliary wheeled device mounted to the rear of the trailer which works in combination with the wheeled jack lift at the front of the trailer.

The invention further relates to an auxiliary wheel device which provides easy retraction and deployment of the auxiliary wheels for use.

In particular, the invention is highly suited for use with dual-axle trailers. It provides for easy maneuvering of the trailer in tight spaces, by allowing the user to move the trailer laterally or rotationally about any point on the trailer.

The invention can be adapted to use with a variety of trailers, the only requirement being that the trailer has a wheeled front jack lift; and the method of construction of the device is more fully described herein.

2. Description of the Prior Art

Various prior art boat trailers, wheels and the like, as well as their apparatuses and the method of their construction in general, are known and found to be exemplary of the U.S. prior art.

Numerous boat trailers or boat dollies having permanently affixed wheels are known, such as U.S. Pat. Nos. 2,844,389 to Burnett and 4,214,774 to Kluge. U.S. Pat. No. 3,883,159 to Whitley, Jr. teaches an auxiliary wheeled device removably attached to the frame of a trailer to prevent dropping of the primary wheels of the trailer over a ledge or depression when launching the boat. Caddies for the tongue end of a trailer are also known, as disclosed in U.S. Pat. Nos. 4,588,204 to Reed and 3,997,191 to Morgan. The patent to Morgan discloses a caster wheel mounted to the front of a trailer which is elevationally adjusted by a winch.

The above listed prior art devices do not teach an auxiliary wheeled device that provides means to raise the main trailer wheels off the ground to improve the maneuverability of the trailer.

These patents or known prior uses teach and disclose various types of boat trailers and caddies and the like, as well as methods of their construction; but none of them, whether taken singly or in combination, disclose the specific details of the combination of the invention in such a way as to bear upon the claims of the present invention.

SUMMARY OF THE INVENTION

An object, advantage and feature of the invention is to provide a novel auxiliary wheeled device for a trailer that is safe and efficient in use, and conveniently lends itself to the improved maneuvering of trailers.

Another object of the invention is directed to a device providing for easy maneuvering of a dual axle trailer by operating in combination with a wheeled front trailer jack, to raise the main wheels of the trailer off the ground, thereby allowing the trailer to be moved laterally or rotated in any direction. Further, the invention allows the user to move the trailer from any point on the trailer. This is a substantial improvement over existing practices whereby the user can only move the trailer from the front or tongue end. In particular, the invention allows the trailer to be turned full circle about itself.

Another object of the invention is to provide a novel and improved method of construction of an auxiliary wheeled device for a trailer, whereby a means for pivotally retracting the device from its operative position to a storage position is provided, allowing the device to be inconspicuous and out of the way when not in use.

Yet another object of the invention is to provide a means for adjusting the length of the leg portion of the auxiliary wheeled device, thereby permitting the device to be adaptable for installation on a range of different trailer heights.

These, together with other objects and advantages of the invention reside in the details of the process and the operation thereof; as is more fully hereinafter described and claimed. References are made to drawings forming a part hereof, wherein like numerals refer to like parts throughout.

DESCRIPTION OF THE PREFERRED EMBODIMENT OF THE INVENTION

Figure 1:
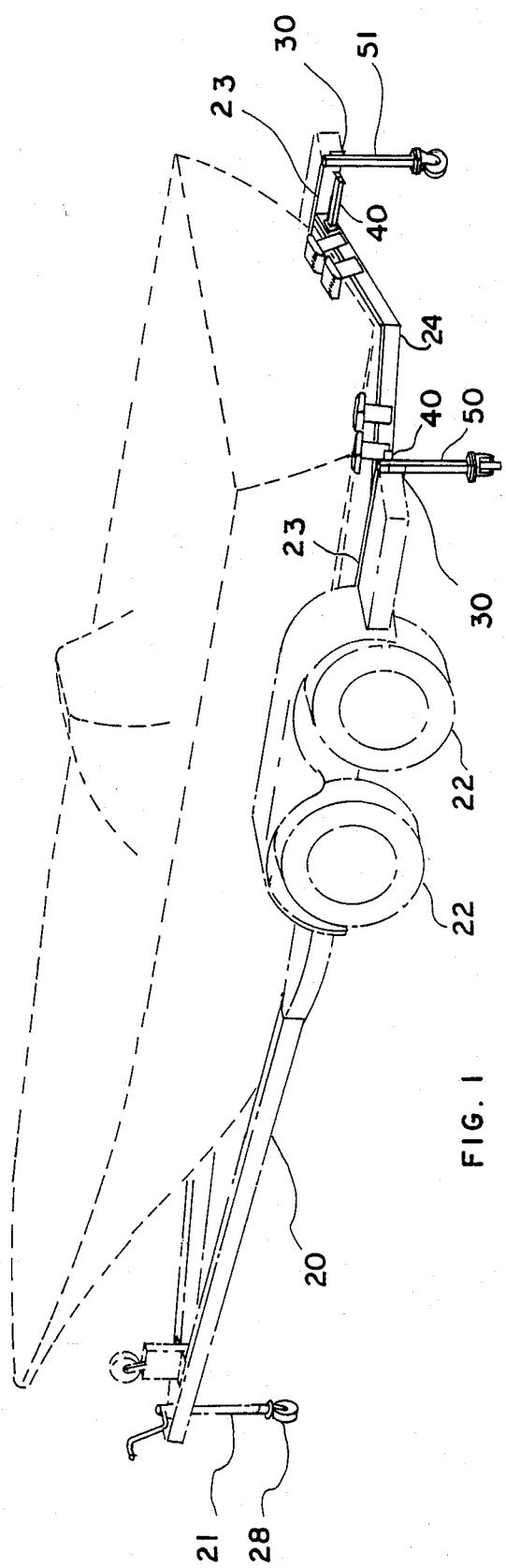
FIG. 1 is a perspective view of the auxiliary wheeled device installed on a conventional boat trailer, according to the best mode and preferred embodiment of the invention.

Referring now to the drawings there is shown in FIG. 1 the invention installed on a conventional boat trailer 20. The trailer 20 has a wheeled front jack 21 as is commonly found on such trailers. The trailer also has wheels 22 as are usually provided. The invention is particularly effective when used with dual axle trailers as shown, however, the invention will also provide enhanced maneuverability for single axle trailers. The trailer commonly has a pair of longitudinal frame rails 23 and a cross member 24 as shown.

As seen in FIG. 1, the invention includes a pair of mounting brackets 30 attached to the longitudinal frame rails 23, a pair of extensible legs 50 pivotally attached to the mounting brackets 30, and a pair of support blocks 40 attached to the cross member 24.

Figure 2:
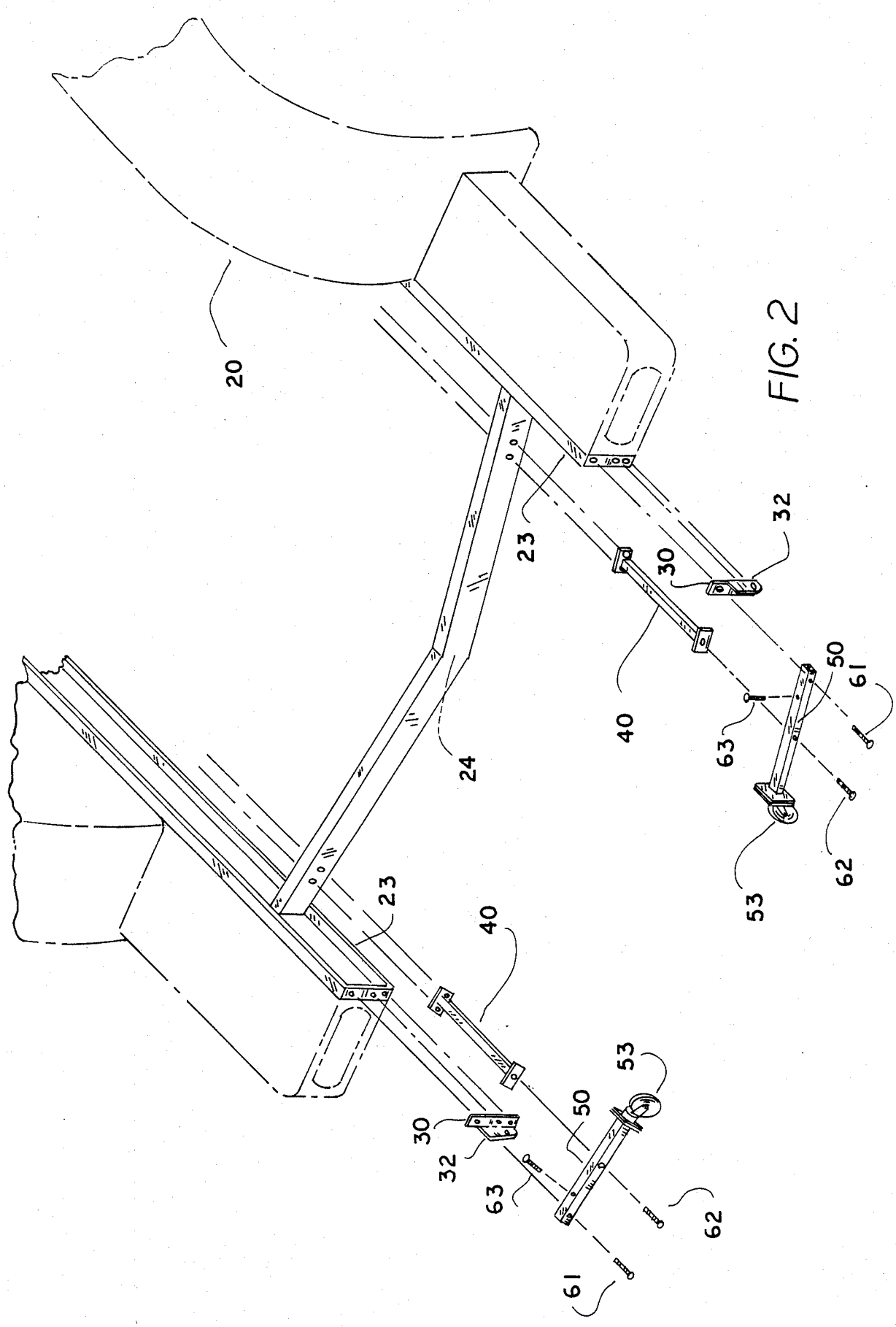
FIG. 2 is a perspective view of the invention installed on the rear of a boat trailer.

FIG. 2 shows the invention installed on the rear of the trailer in more detail. Mounting bracket 30 is mounted to rail 23 by a suitable fastener. The bracket 30 has a vertical flange 32, which provides a sturdy support for the leg 50 when the leg 50 is in a vertical position. The leg 50 may be secured against the flange 32 by a releasable fastener 63 so that the leg 50 will not collapse while supporting the boat. The leg 50 is pivotally mounted to the mounting bracket 30 by a bolt or suitable hinge type fastener 61, and includes a caster type wheel 53 at its lower end. The leg may be of a telescoping design with a lock bolt. Support block 40 is attached at one end to the cross member 24 as shown. The support block 40 at its other end can support the leg 50 in a horizontal, or storage, position, by means of a suitable releasable fastener 62.

Figure 3:
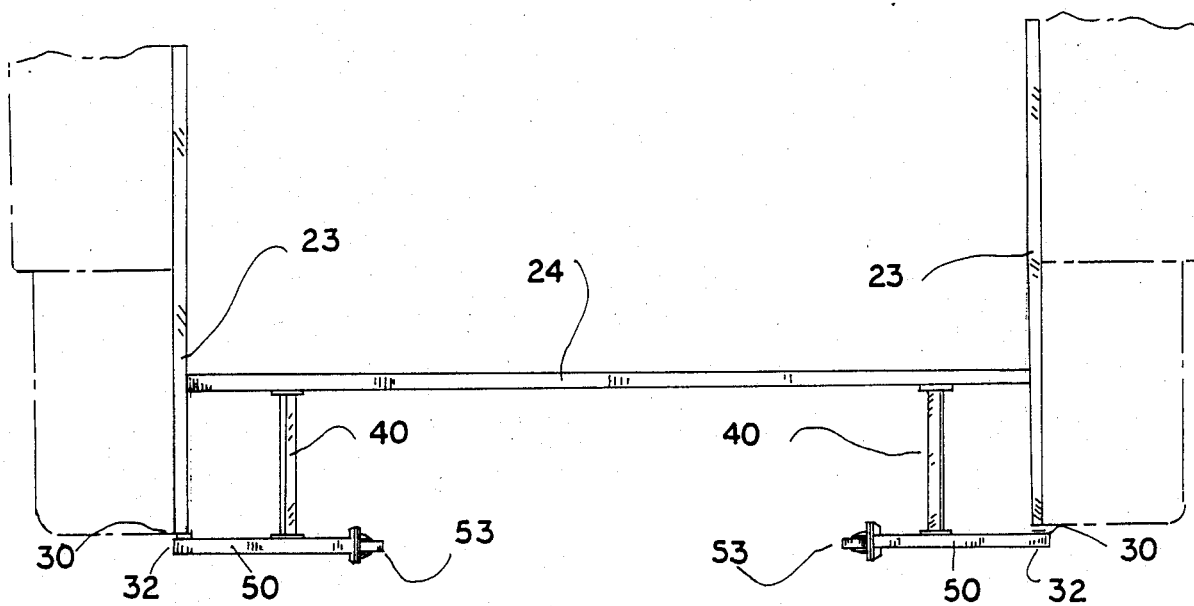
FIG. 3 is a top view of the invention installed on the rear of a boat trailer.
Figure 4:
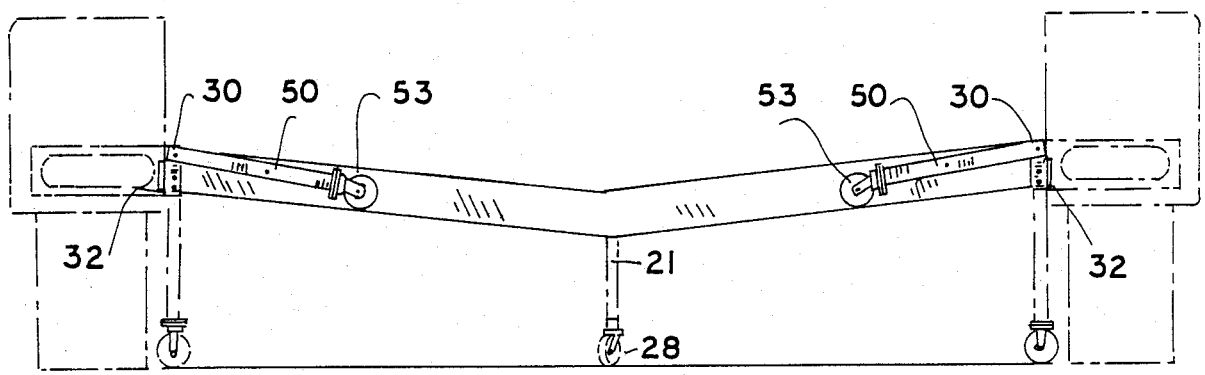
FIG. 4 is a rear elevation view of the invention installed on the rear of a boat trailer.

FIGS. 3 and 4 show the invention installed on the rear of the trailer 20. Each leg 50 may be swung into either of two positions. In its upward horizontal storage position, the leg 50 is stowed conveniently out of the way while the trailer is in normal operation. The legs 50 are attached to the support block 40 by means of a bolt or suitable removable fastener 62. When the trailer 20 is supported in front by the trailer jack 21, the legs 50 may be swung down into their vertical position, almost touching the ground. The legs 50 can then be locked in a vertical position by means of a bolt or releasable fastener 63 attaching the leg 50 to the vertical flange 32.

Figure 5A:
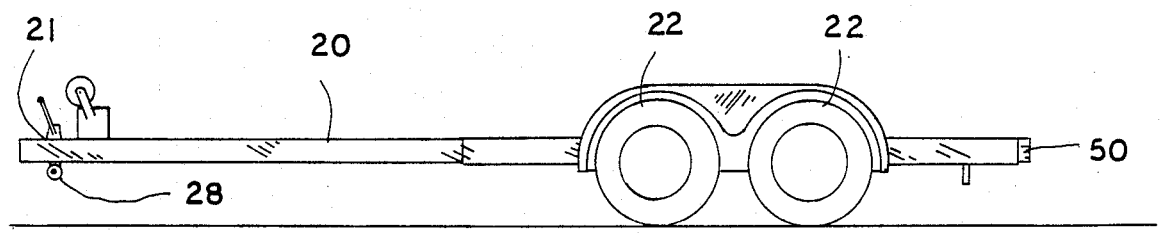
FIGS. 5A, 5B, and 5C are side views of a boat trailer with the invention installed, and illustrating the sequence of using the invention in conjunction with the front jack of the boat trailer.
Figure 5B:
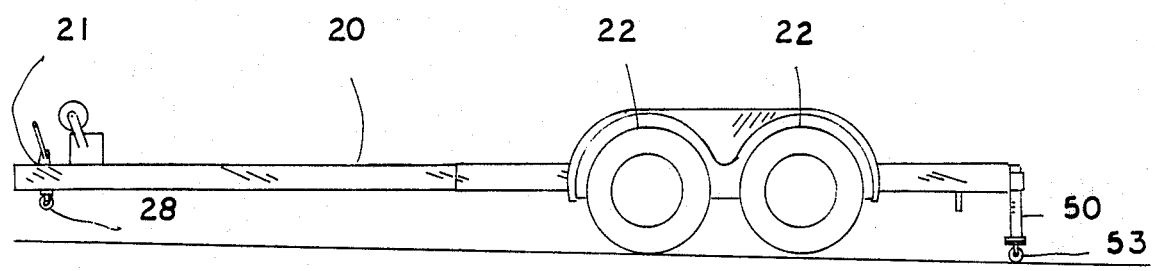
Figure 5C:
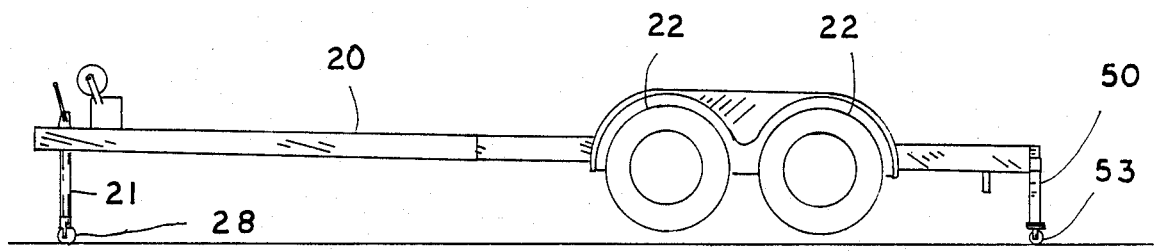

FIG. 5A shows a side view of a trailer 20 with the legs 50 swung into a horizontal position. In FIG. 5B, the legs 50 are swung down and locked in to their vertical position, nearly touching the ground. In FIG. 5C, the front jack 21 is lowered, thereby elevating the trailer onto a tripod formed by the front jack 21, and the legs 50. The main trailer wheels 22 are raised off the ground, permitting maneuvering of the trailer on the jack wheel 28 and the leg wheels 53.

Figure 6:
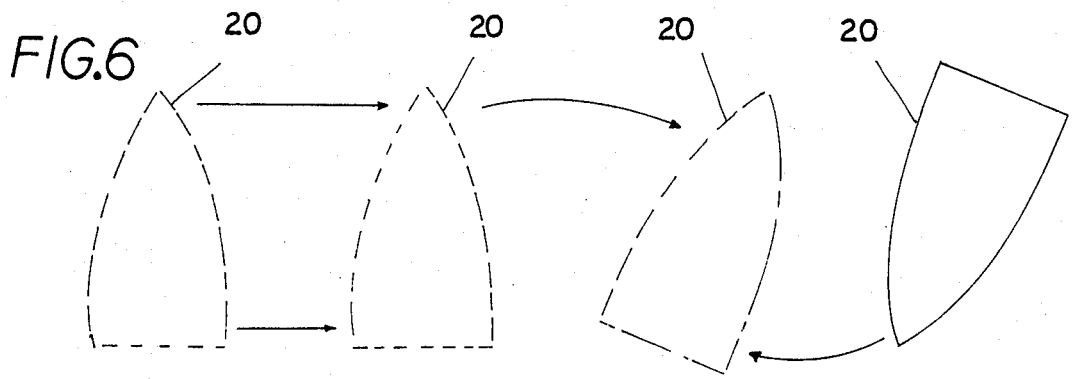
FIG. 6 is a top view of a boat trailer in motion, showing the types of added mobility that are provided by the invention.

As shown in FIG. 6, the invention provides for greatly enhanced maneuvering of the trailer 20. In particular, the invention allows the trailer to be moved sideways, or rotated about any vertical axis. In effect, the invention allows the trailer to be turned full circle in any circular area with a diameter greater than the trailer length. This is an improvement over conventional trailers that require the operator to move the trailer from the tongue only. In particular, dual axle trailers are difficult to move in a tight radius circle without the installation of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. An auxiliary wheeled support device for use in combination with a trailer having a castor wheeled front jack, comprising;
   a pair of mounting brackets attached to the rear of said trailer;
   a pair of support blocks attached to the rear of said trailer, located between said mounting brackets;
   a pair of legs, each said leg having two ends, the first end of each said leg pivotally attached to one of said mounting brackets, so that each said leg may be pivoted to a vertical position extending downwardly from said mounting bracket, or pivoted to a horizontal position;
   first means for locking each said leg to a respective mounting bracket in said vertical position;
   second means for locking each said leg to a respective support block in said horizontal position;
   a pair of castor wheels, each of said wheels attached to the second end of one of said legs;
   whereby when said trailer jack is lowered, said legs can be moved to said vertical position and when said trailer jack is raised thereafter, said trailer is solely supported by said wheeled front jack and said wheeled pair of legs and said trailer can be moved around upon the castor wheels.

2. The auxiliary wheeled support device of claim 1, wherein;
   said legs are extensible; and including;
   third means for locking said legs against extension.

3. The auxiliary wheeled support device of claim 1, wherein;
   said first means for locking each said leg in said vertical position includes;
   a pair of vertical flanges, one of said flange projecting from each of said mounting brackets;
   a pair of first fasteners, each said fastener releasably attaching each said leg to each said vertical flange on each said mounting bracket, thereby fastening each said leg in a vertical position.

4. The auxiliary wheeled support device of claim 1, wherein;
   said second means for locking each said leg in said horizontal position includes;
   a pair of second fasteners; each of said fasteners releasably attaching each said leg to a respective said support block, thereby fastening each said leg in a horizontal position.

* * * * *